United States Patent [19]

Scanlon

[11] Patent Number: 4,818,015
[45] Date of Patent: * Apr. 4, 1989

[54] VEHICULAR AIRFOILS

[76] Inventor: Barry F. Scanlon, 939 Cumberland Rd., Atlanta, Ga. 30306

[*] Notice: The portion of the term of this patent subsequent to Apr. 4, 2004 has been disclaimed.

[21] Appl. No.: 941,026

[22] Filed: Dec. 12, 1986

Related U.S. Application Data

[60] Continuation-in-part of Ser. No. 614,117, May 25, 1984, abandoned, which is a division of Ser. No. 319,628, Nov. 9, 1981, Pat. No. 4,451,074.

[51] Int. Cl.$^4$ .............................................. B62D 35/00
[52] U.S. Cl. .............................. 296/180.1; 296/180.2; 296/180.4
[58] Field of Search ....................... 296/1 S, 91, 180.1, 296/180.2, 180.4

[56] References Cited

U.S. PATENT DOCUMENTS

| | | | |
|---|---|---|---|
| 3,239,267 | 3/1966 | Reynolds | 296/1 S |
| 4,078,395 | 3/1978 | Crowe et al. | 62/239 |
| 4,142,755 | 3/1979 | Keedy | 296/1 S |
| 4,236,745 | 12/1980 | Davis | 296/1 S |
| 4,257,641 | 3/1981 | Keedy | 296/1 S |
| 4,451,074 | 5/1984 | Scanlon | 296/1 S |
| 4,470,628 | 9/1984 | Husted | 296/1 S |
| 4,474,403 | 10/1984 | Miller | 296/96 |
| 4,505,508 | 3/1985 | Carter | 296/39 R |

FOREIGN PATENT DOCUMENTS

| | | | |
|---|---|---|---|
| 2509681 | 1/1983 | France | 296/1 S |
| 823209 | 4/1981 | U.S.S.R. | 296/1 S |

OTHER PUBLICATIONS

Design, Aug. 1981, pp. 48 and 5, Articles on Fuel Savings and Nose Cone Fairing.

Primary Examiner—Dennis H. Pedder
Attorney, Agent, or Firm—Thomas & Kennedy

[57] ABSTRACT

Collapsible airfoils which reduce wind resistance in their operational positions on the front and rear of a vehicle are moved with minimum effort to and from collapsed stored positions on the sides of the vehicle, such as a truck. A multi-section frame is provided for each resilient airfoil section adapted to be configured flatly for storage and configured erected in use. Slide mechanisms for the folding of resilient airfoil sections are provided front and rear on the vehicle side walls. A secure locking device for the airfoils in their erected operational positions is provided.

7 Claims, 11 Drawing Sheets

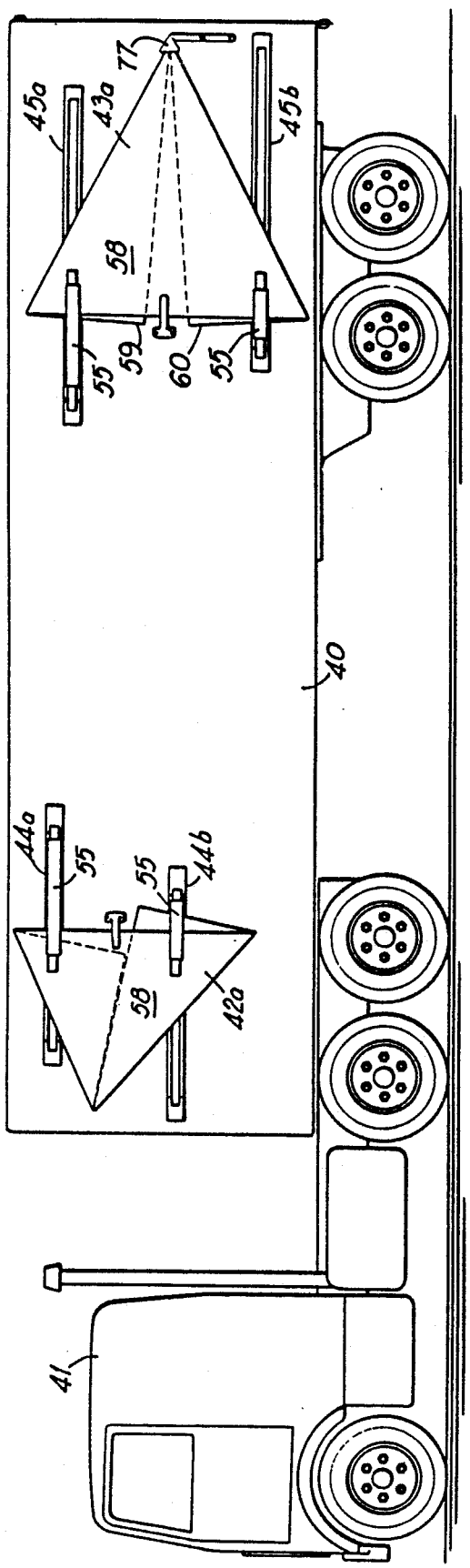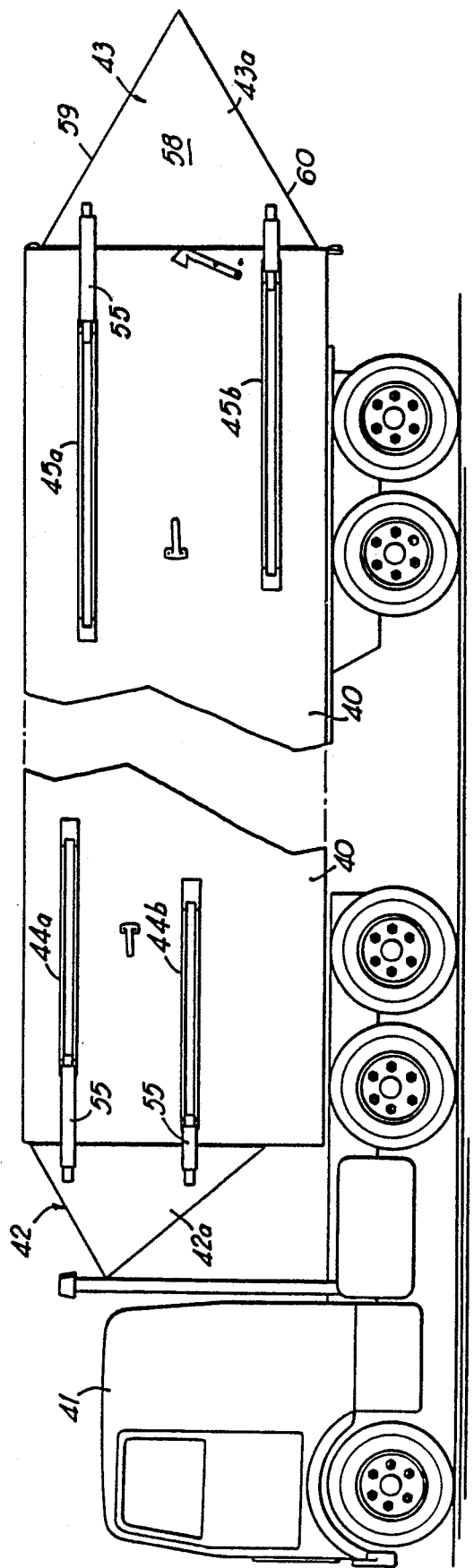

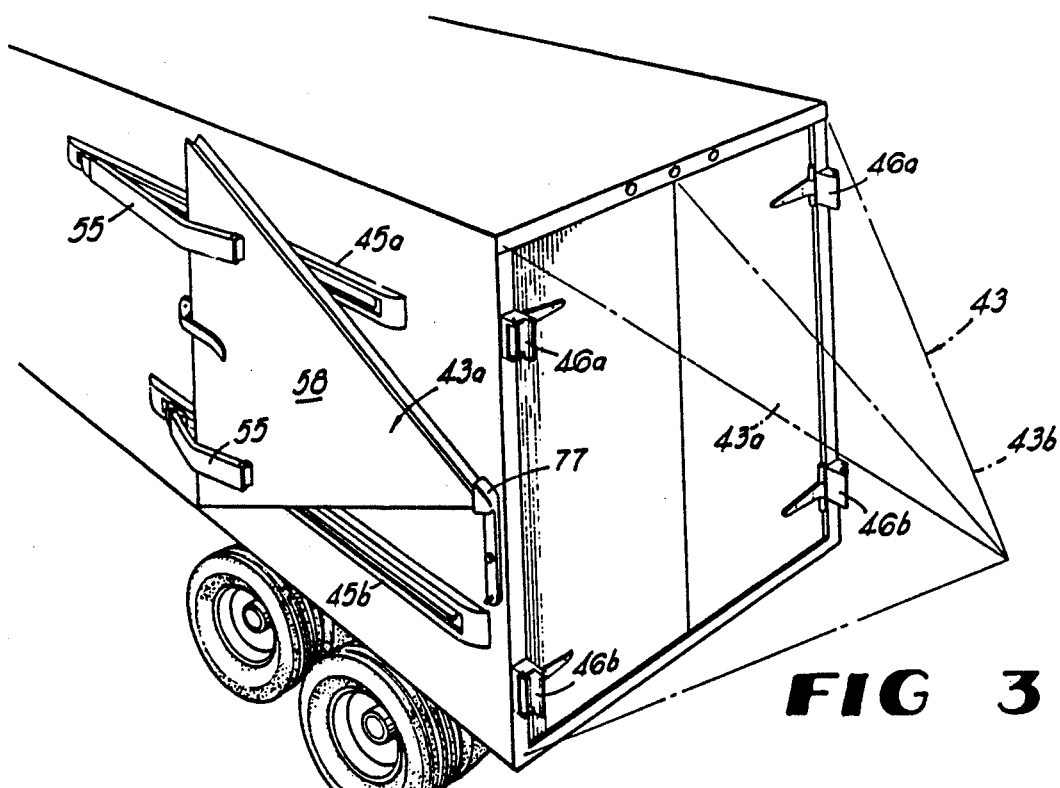
FIG 3
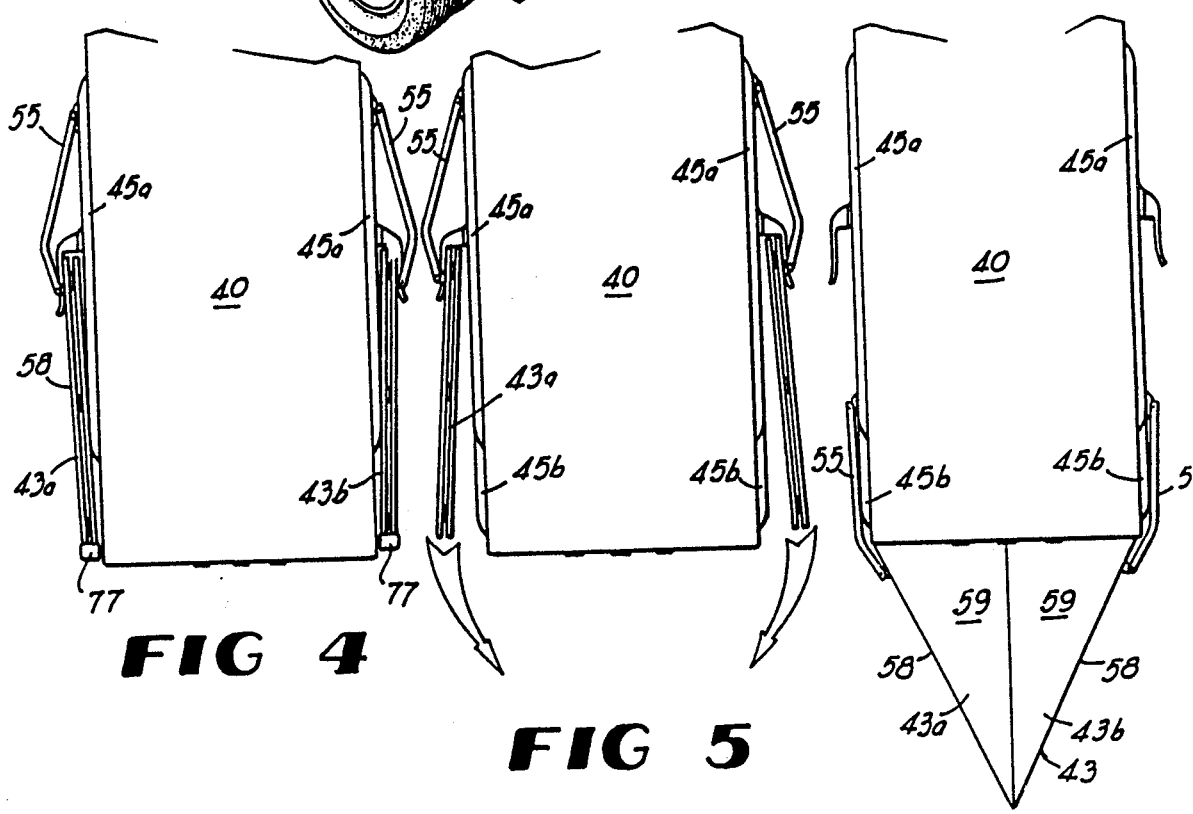
FIG 4
FIG 5
FIG 6

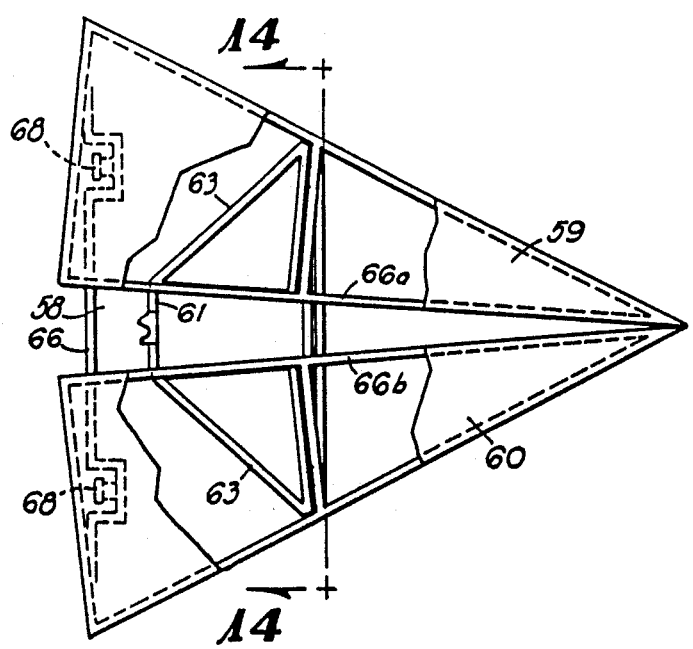
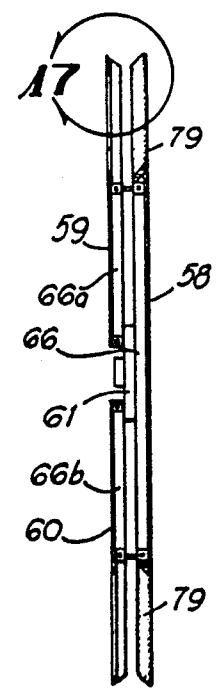
FIG 13  FIG 14
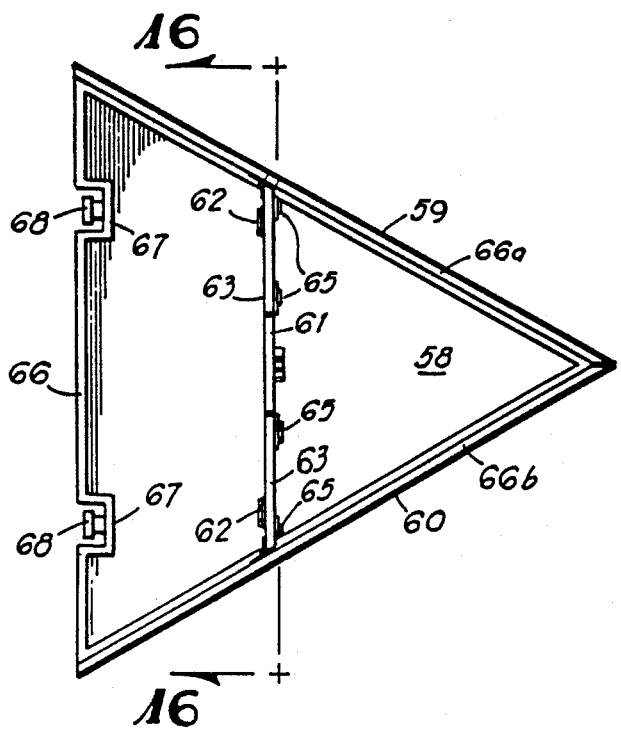
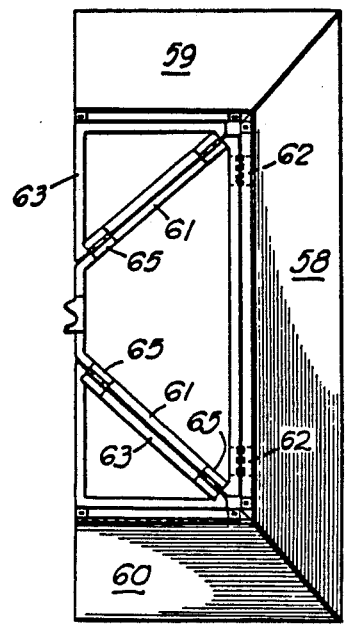
FIG 15  FIG 16

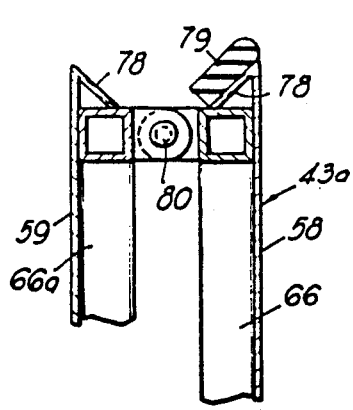
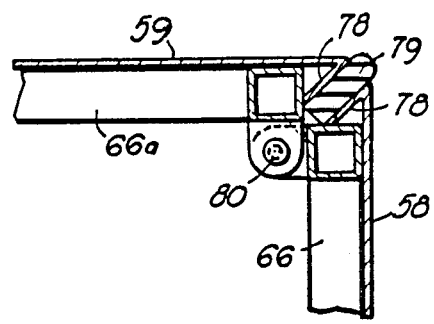
FIG 17   FIG 18
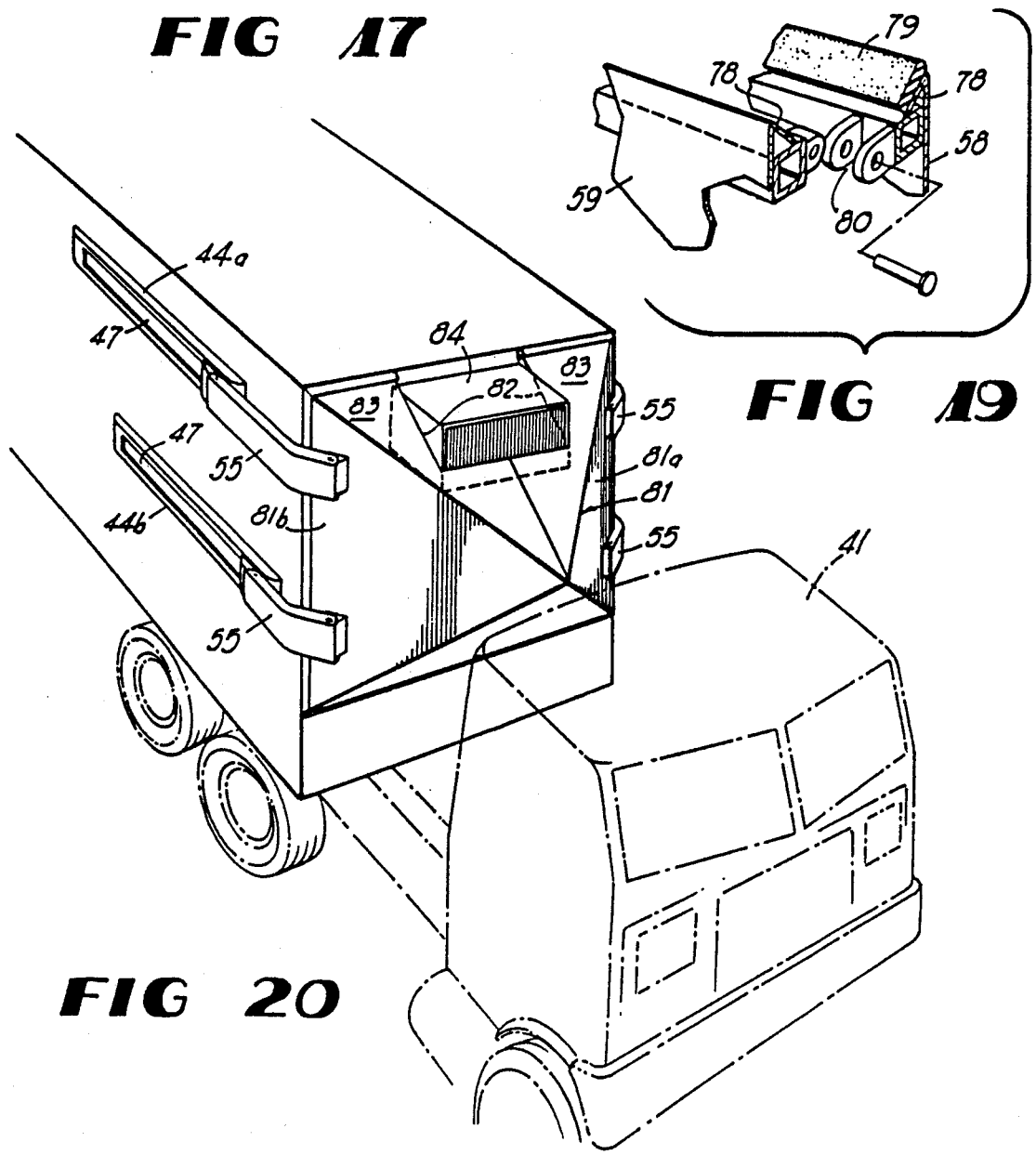
FIG 19
FIG 20

VEHICULAR AIRFOILS

REFERENCE TO RELATED APPLICATION

This is a continuation-in-part of application Ser. No. 614,117 filed May 25, 1984, abandoned which is a divisional of application Ser. No. 319,628 filed Nov. 9, 1981, now U.S. Pat. No. 4,451,074.

TECHNICAL FIELD

This invention relates to devices for reducing wind resistance and drag on trucks and semi-trailers.

BACKGROUND OF THE INVENTION

Devices to reduce wind resistance and drag on roadway vehicles, such as large trucks, are well known in the prior art. The most common of these devices is a fixed inclined wind deflector at the top of the driver's cab in a tractor trailer vehicle. There are also some prior art teachings relative to folding devices of this character for the front and/or rear of the vehicle which can be detached and stored in a rack beneath the vehicle. It is a general objective of this invention to improve on the known prior art by providing airfoil devices for roadway vehicles of increased operational efficiency and greater simplicity of construction, thereby rendering them more practical and economical.

SUMMARY OF THE INVENTION

More particularly, in accordance with the invention, front and rear collapsible airfoils for trucks and semi-trailers are provided in the form of laterally opposing, resilient half sections which come together at the front and rear of the vehicle to form unitized airfoils which reduce aerodynamic drag to the greatest possible extent. The opposing halves or sections of the airfoils are storable in collapsed, essentially flat conditions on the two side walls of the vehicle near the front and rear ends thereof. Very efficient slide and locking mechanisms for the collapsible foil sections are provided on each side wall of the vehicle, front and rear. The airfoils are movable to and from their stored positions with minimum effort and possess internal folding support frames for stability and safety.

Other features and advantages of the invention will become apparent during the course of the following description.

BRIEF DESCRIPTION OF THE DRAWING

FIG. 1 is a side elevational view of a truck equipped with front and rear collapsible airfoils according to the invention, with the airfoils shown in their collapsed, stored positions.

FIG. 2 is a similar view showing the airfoils in their erected, operational positions.

FIG. 3 is a fragmentary, perspective view showing one stored airfoil section for the rear of the truck and showing schematically, in phantom lines, the two erected airfoil sections at the rear of the truck.

FIGS. 4, 5 and 6 are three sequence plan views showing stages of movement of the rear airfoil sections from their stored to their operational positions.

FIG. 13 is an interior side elevational view of one folded airfoil section.

FIG. 14 is a vertical sectional view taken substantially on line 14—14 of FIG. 13.

FIG. 15 is an interior side elevational view of one erected airfoil section.

FIG. 16 is a vertical sectional view taken on line 16—16 of FIG. 15.

FIG. 17 is an enlarged, cross-sectional view taken through the folded airfoil section in the area encompassed by the line 17 in FIG. 14.

FIG. 18 is a detailed view similar to FIG. 17 showing the airfoil section in its erected state.

FIG. 19 is a fragmentary, exploded, perspective view of the hinge joint shown in FIGS. 17 and 18.

FIG. 20 is a perspective view of a front collapsible airfoil according to a second embodiment of the invention.

DETAILED DESCRIPTION

Figure 7:
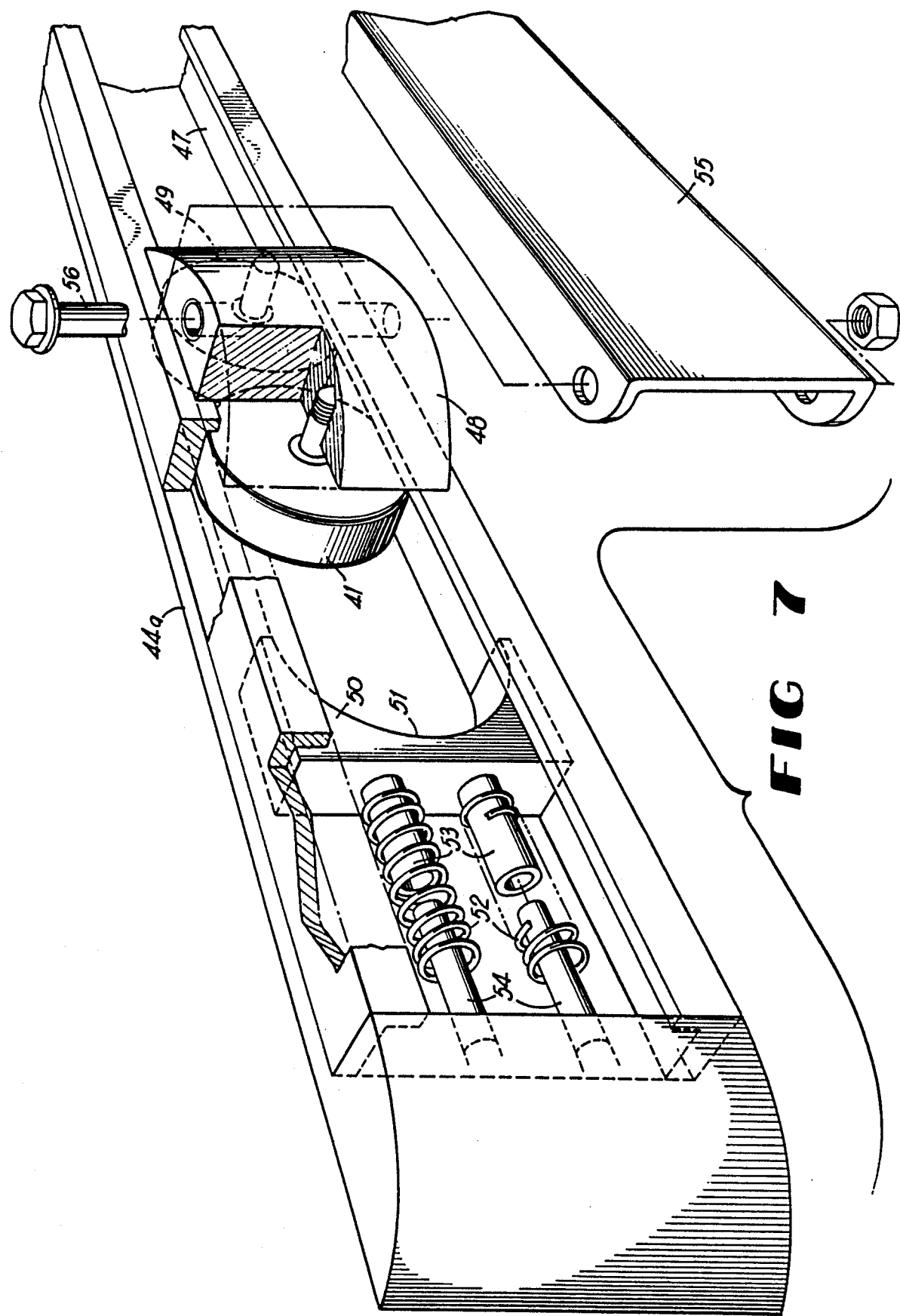
FIG. 7 is an enlarged, fragmentary, partly exploded and partly sectioned perspective view of the slide mechanism for one front airfoil section.

Referring to the drawings in detail, wherein like numerals designate like parts, and making reference initially to FIGS. 1 through 19, a conventional semi-trailer truck body 40 is illustrated in trailing relationship to a tractor unit having the usual cab 41 for a driver. In accordance with the present invention, front and rear collapsible side storable airfoils 42 and 43 for the truck body 40 are provided, each being of pyramid formation when in the erected, operational state, as shown in FIG. 2. Each airfoil 42 and 43 is constructed in two laterally opposing half sections 42a and 42b and 43a and 43b.

Each airfoil section 42a and 43a is an individual foldable and erectable unit adapted to be stored during periods of non-use on one side wall of the truck body 40 near the front or rear thereof, as shown in FIG. 1 and in FIG. 4. To facilitate this side storing of the airfoil sections 42a and 43a in flat collapsed conditions, pairs of upper and lower airfoil slide and support rail units 44a, 44b and 45a, 45b are fixed horizontally in spaced parallel relationship on the opposite side walls of truck body 40. Each airfoil section 42a, 42b and 43a, 43b includes an internal, self-contained, folding support frame shown particularly in FIGS. 11 through 19 and these frames will be fully described hereinafter. Associated with each rail unit 45a and 45b on each side of the truck body 40 in alignment therewith is a fixed locking socket unit 46a and 46b at the rear end of the truck body. Corresponding fixed locking socket units are provided on the front of the truck body 40 to cooperate with the front rail units 44a, 44b. Preferably, for the sake of stability and to resist cocking of the stored airfoil sections 42a and 43a, the horizontal rail units 44a and 45a are longitudinally staggered relative to the lower rail units 44b and 45b, as shown in FIGS. 1 and 2.

Figure 8:
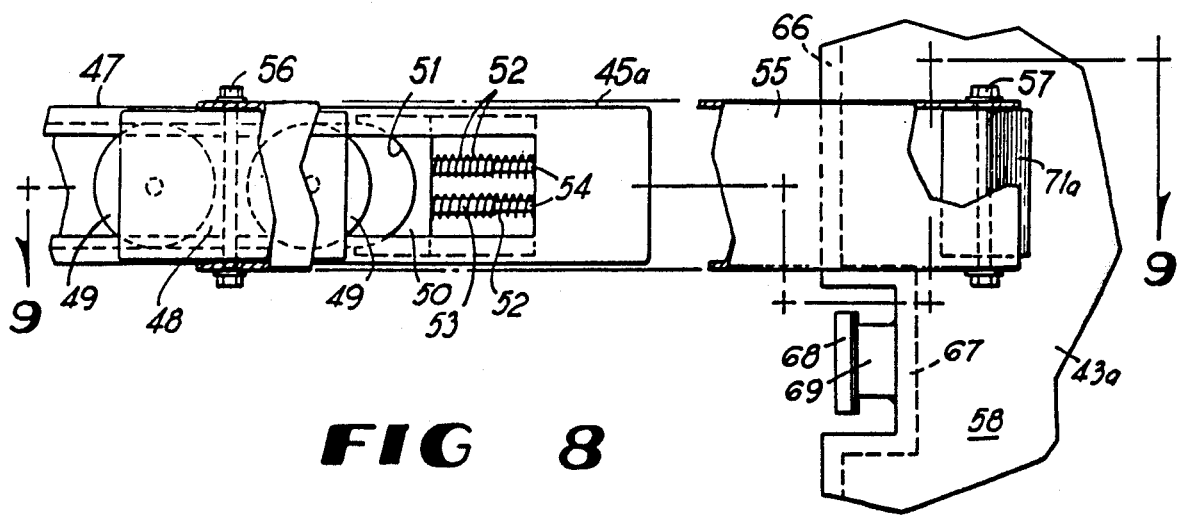
FIG. 8 is a fragmentary, side elevational view showing the slide and locking mechanism for a rear airfoil section.
Figure 9:
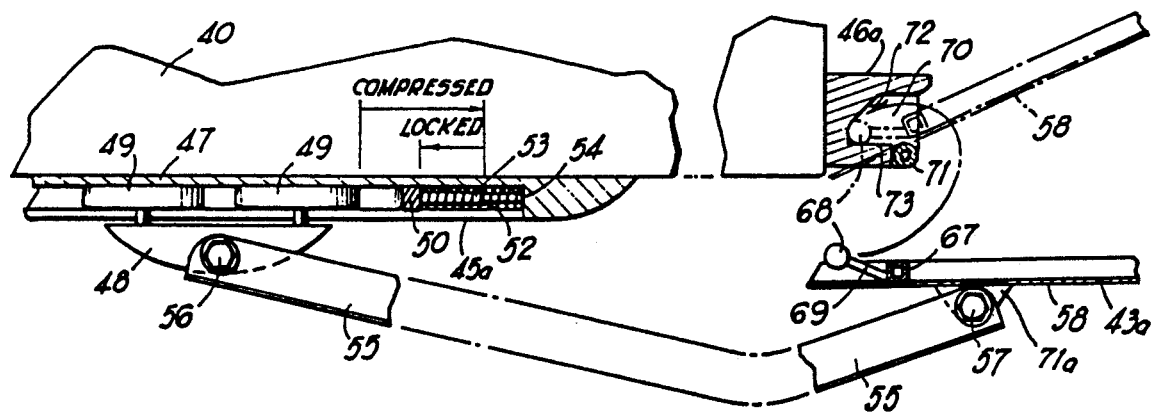
FIG. 9 is a horizontal sectional view taken on line 9—9 of FIG. 8.
Figure 10:
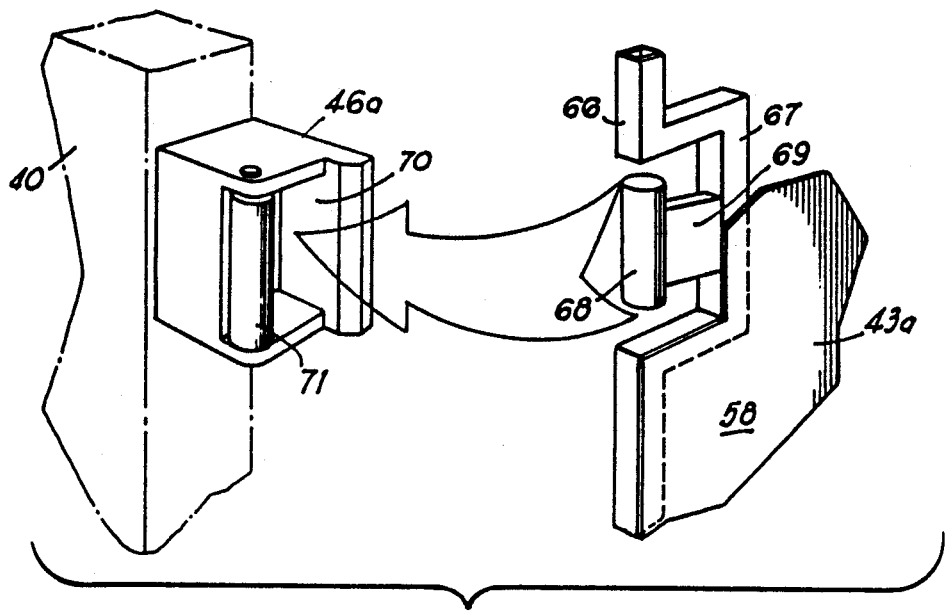
FIG. 10 is a fragmentary, perspective view of the lock in FIGS. 8 and 9.

The details of one typical front rail unit 44a for one front airfoil section 42a are shown in FIG. 7 and corresponding details of one rear rail unit 45a for one rear airfoil section 43a are shown in FIGS. 8 and 9. Each rail unit includes a channel rail body 47 suitably fixed to one vertical side wall of the truck body 40. A carriage block element 48 is disposed closely adjacent to the outer face of rail body 47 and is attached to a pair of tandem wheels 49 which can roll along the rail body 47 forwardly and rearwardly with minimum friction and are guided thereby. A spring-biased stop block 50, having an arcuate wheel-receiving recess 51, is positioned movably in the channel rail body 47 near both ends thereof to arrest and cushion movement of the wheel supported block 48 and the airfoil section attached thereto when the latter is moved manually toward the deployed or use position as well as the stored position. The stop block 50 for the front airfoil sections is arranged oppositely from the stop block for the rear airfoil sections as shown, respectively, in FIGS. 7, 8 and 9.

Each stop block 50 is cushioned by a pair of springs 52 which surround telescopically interengaging movable and fixed posts 53 and 54 secured, respectively, to block 50 and the end wall of rail body 47 The stop block 50 has guided engagement with the rail body 47.

Support arms or struts 55 for each movable air foil section 42a and 43a are provided and the interior ends of these struts are pivotally attached by a pivot element 56 to carriage blocks 48. The struts 55 extend horizontally and are swingable about the vertical axes of pivot elements 56. The struts at their opposite ends are pivotally connected at 57 to the respective collapsible and movable front and rear airfoil sections 42a and 43a via aperatured journals 71a, as seen in FIGS. 8 and 9.

As best shown in FIGS. 11 through 16, each folding airfoil section includes a center or main triangular panel 58 formed of semi-rigid sheet material and two cooperative folding wing panels 59 and 60 of the same type material hinged thereto. Each airfoil section includes a rigid, folding support frame shown in FIGS. 11 through 16 which comprises a center, truncated triangular frame section 61 hinged at its base at 62 to the panel 58 and adapted to swing up during use to a poisition normal to the panel 58. The frame of each airfoil section further comprises two side triangular frame sections 63 hinged at 64 to the side panels 59 and 60 and hinged at 65 to the center frame section 61. When each folding airfoil section 42a, 42b and 43a, 43b is being moved from its stored position on one side of the truck body to the erected use position at the front or rear of the body, the described three-part support frame is manually unfolded with the center frame section 61 and the two side triangular frame sections 63 disposed in a common plane, as clearly shown in FIG. 12. When each airfoil section is collapsed, FIG. 11, the frame sections 63 are folded over onto the intrior side of the center frame section 61.

Figure 12:
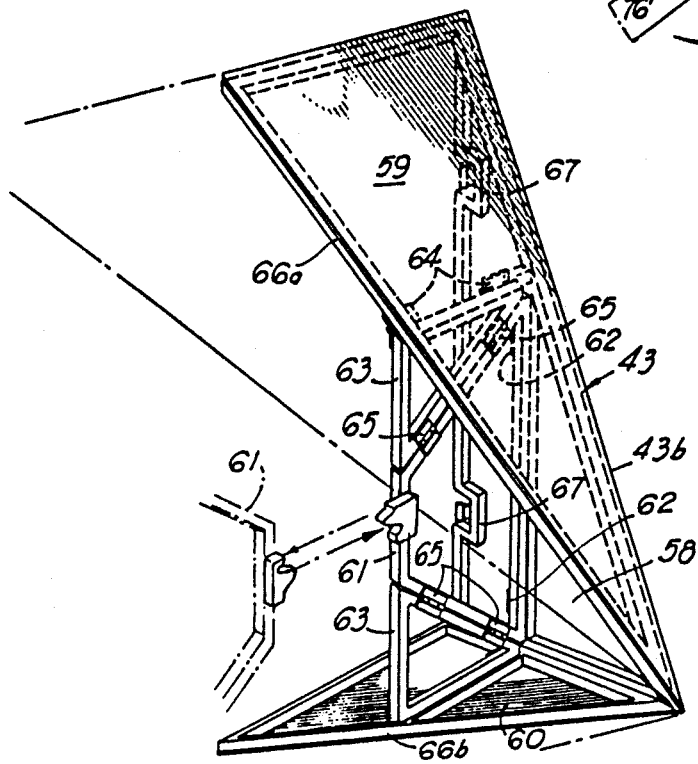
FIG. 12 is a fragmentary, perspective view of one airfoil section in the erected state with its support frame.
Figure 21:
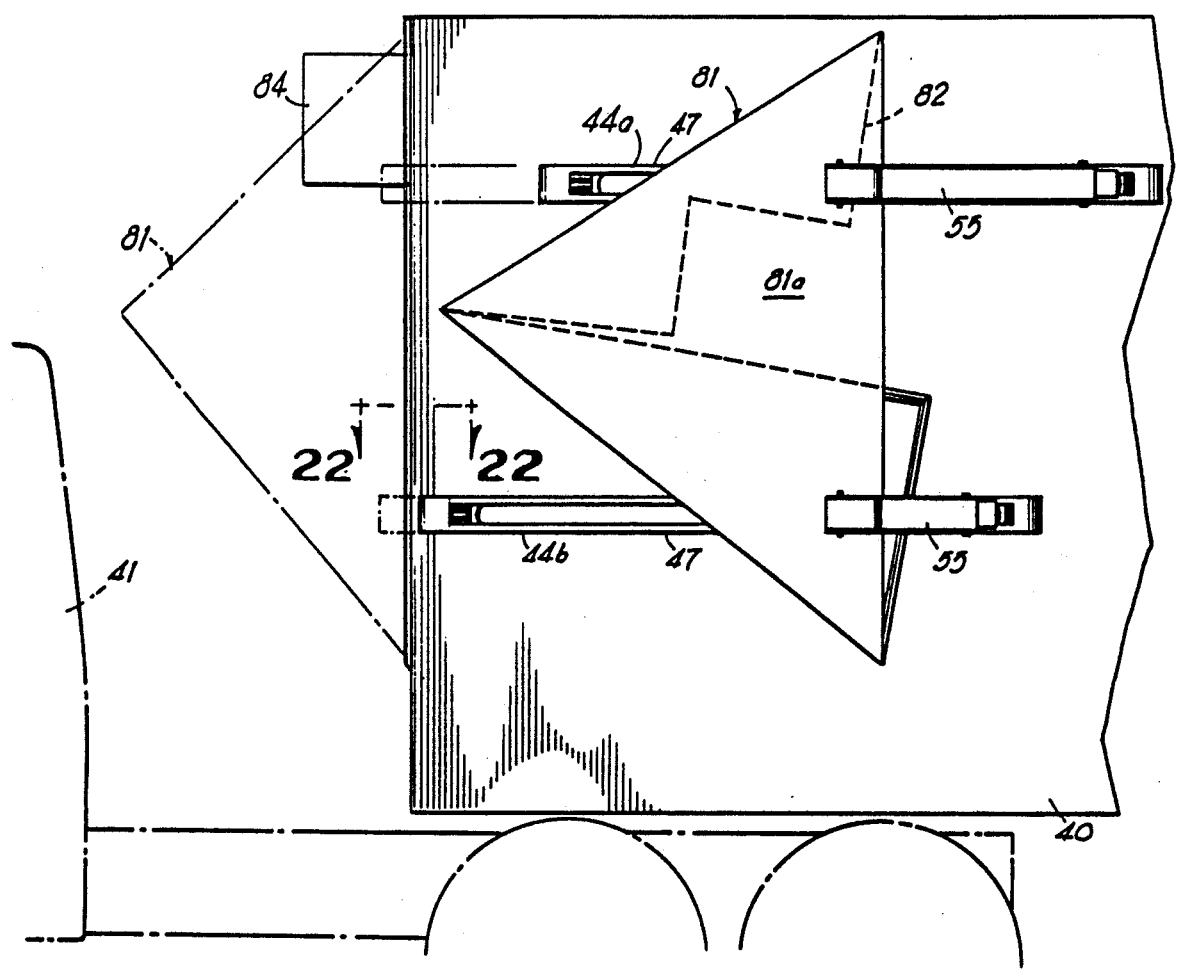
FIG. 21 is a side elevation showing one section of the airfoil in FIG. 20 folded and stored on one side wall of the vehicle.

The framework of each folding airfoil section further comprises a triangular perimeter frame 66 and 66a and 66b for each of the triangular folding portions 58, 59 and 60. The folding frame sections 61 and 63, when erected as shown in FIG. 12, are self-locking so as to support the three panels of the airfoil section or unit securely in the unfolded use position.

Each perimeter frame 66 for the center panel 58 of each airfoil unit has two offset portions 67 therein in spaced relationship and in alignment with the locking sockets 46a and 46b on the end walls of the truck body 40. Within each offset portion 67 is a rigid T-bolt 68 whose shank 69 is arranged at a fixed angle to the panel 58 so that the T-bolt can enter the locking cavity 70 of socket unit 46a by pivoting around a vertical axis roller 71 at one side of the mouth of such cavity until the T-bolt assumes the full locking position shown in phantom lines in FIG. 9 during the deployment of the particular section of the airfoil. In such locking position, the T-bolt 68 is held in a corner defined by an inclined cam surface 72 and a vertical surface 73, FIG. 9.

In moving to the locking position from the side stored position, considering one of the rear airfoil sections, the strut 55 and its carriage block 48 are moved rearwardly with the attached airfoil section until the rearmost wheel 49 engages in the cavity 51 of stop block 50 which is opposed by the springs 52. Further movement of the assembly will begin to compress the springs 52 and by the time that the T-bolt 68 begins to enter the locking cavity 70 by appropriate pivoting of the panel 58, the springs are substantially fully compressed or solid. However, when the T-bolt 68 fully enters the cavity 70 and assumes the locking position shown in phantom lines in FIG. 9, the strut 55 and associated elements will have backed off somewhat relieving some of the compression on the springs 52. The springs will, however, remain compressed sufficiently to firmly seat the T-bolt 68 in the locking cavity 70 while the particular airfoil section is deployed for use. Thus, a type of over-dead-center spring-loaded lock for each airfoil section in the use position is provided by the invention.

When the particular airfoil section has been moved from its stored position to its use position as shown graphically in FIGS. 4, 5 and 6, the internal framework shown in FIGS. 11-16 will have been fully unfolded and the base edges of the three panels 58, 59 and 60 of the unit will be in abutting relation with the rear vertical wall of the truck body 40, as best shown in FIGS. 3 and 6. A very stable mounting is thus provided for each airfoil section by the locking mechanism shown particulaly in FIGS. 7-10.

It will be understood that in order to erect the two side-by-side sections of the front or rear airfoils 42 and 43, each section must be deployed in the manner just described and separately locked. Such full deployment of an airfoil is shown in FIG. 6 and in phantom lines in FIG. 3. The two companion airfoil sections create a pyramid airfoil with the apex of the pyramid extending rearwardly or forwardly, as the case may be.

Figure 11:
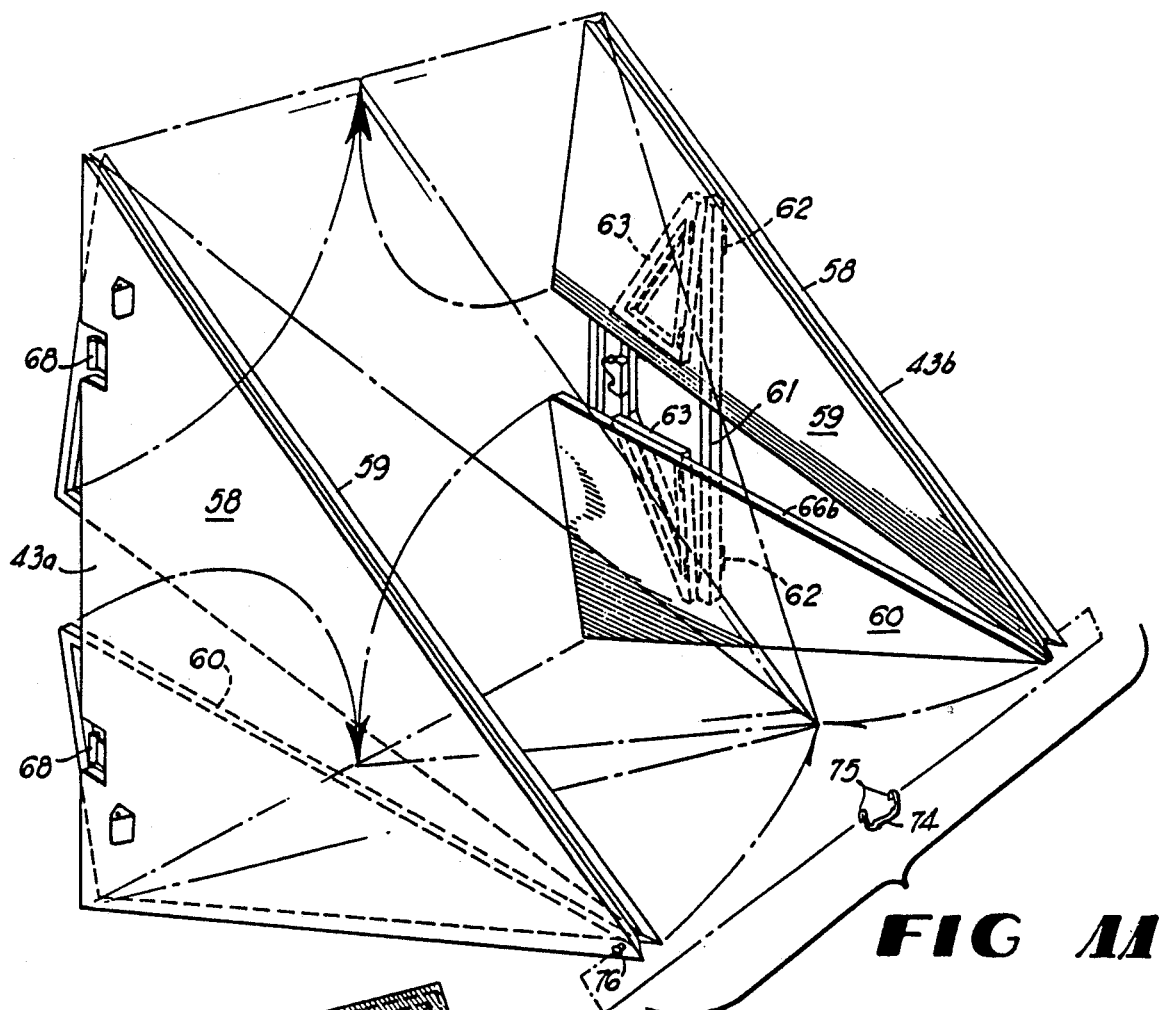
FIG. 11 is a perspective view of one airfoil showing its opposing sections folded together with the internal airfoil support frame.

To assure that the erected companion sections of the airfoil will not separate at the apex, a stretchable cord 74, FIG. 11, may be utilized with its terminal hooks 75 engaging pins 76 at the apices of the two airfoil sections 43a, 43b or 42a, 42b. Other forms of attaching means could be used. When the airfoil sections are in their stored positions, their apices engage with locking socket elements 77 provided on the side walls of the truck body. To return each airfoil section to the stored position, a reverse operation from that described in deploying the device is followed.

As shown in FIGS. 17-19 of the drawings, the hinged panels of each airfoil section, such as the panels 58 and 59, have opposing angled meeting faces 78 intervened by a compressible seal 79 attached to one such face. Hinges 80 between the perimeter frames 66 and 66a are also shown in detail in FIGS. 17-19.

FIGS. 20-23 show a variant of the embodiment of the invention shown in FIGS. 1 through 19. In FIGS. 20-23, a front pyramid airfoil assembly 81 is shown, substantially identical to the front airfoil 42 of the prior embodiment, except that the two companion airfoil sections 81a and 81b forming the assembly 81 are notched at 82 in their top panels 83 to accommodate a truck air conditioner 84 without obstructing the flow of air into the same. One recognized disadvantage of fixed cab-mounted deflectors in common use today is that they may obstruct the flow of air to refrigeration units. Another disadvantage is that they limit the ability of the cab to pass under low obstructions, such as shop doorways, in some instances. Except for the provision of the cutouts 82, the construction and operation of the airfoil 81 is identical to that of the prior embodiment and therefore the detailed description need not be repeated.

Figure 22:
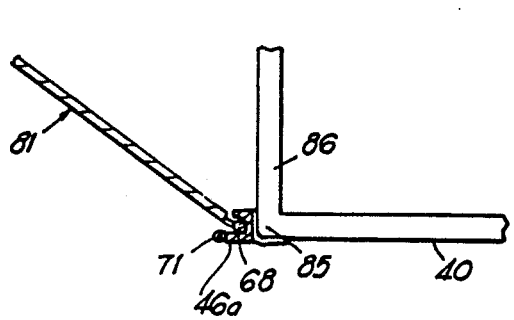
FIG. 22 is an enlarged fragmentary horizontal section taken on line 22—22 of FIG. 21 showing a truck body having a square corner.
Figure 23:
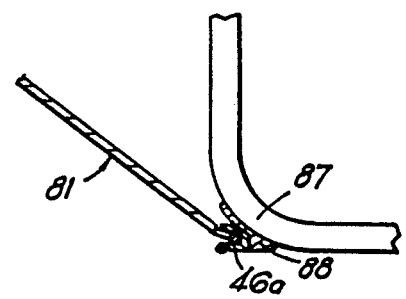
FIG. 23 is a similar view in connection with a truck or other vehicle having a rounded corner.

FIG. 22 shows the truck body 40 possessing a square corner 85 with the described locking socket 46a positioned on the truck body front wall 86 adjacent to this square corner and the T-bolt 68 in the locking position. FIG. 23 shows a truck body having a rounded corner 87 with the locking socket 46a mounted thereon by an attached curved adapter plate 88 secured to the truck body.

Figure 24:
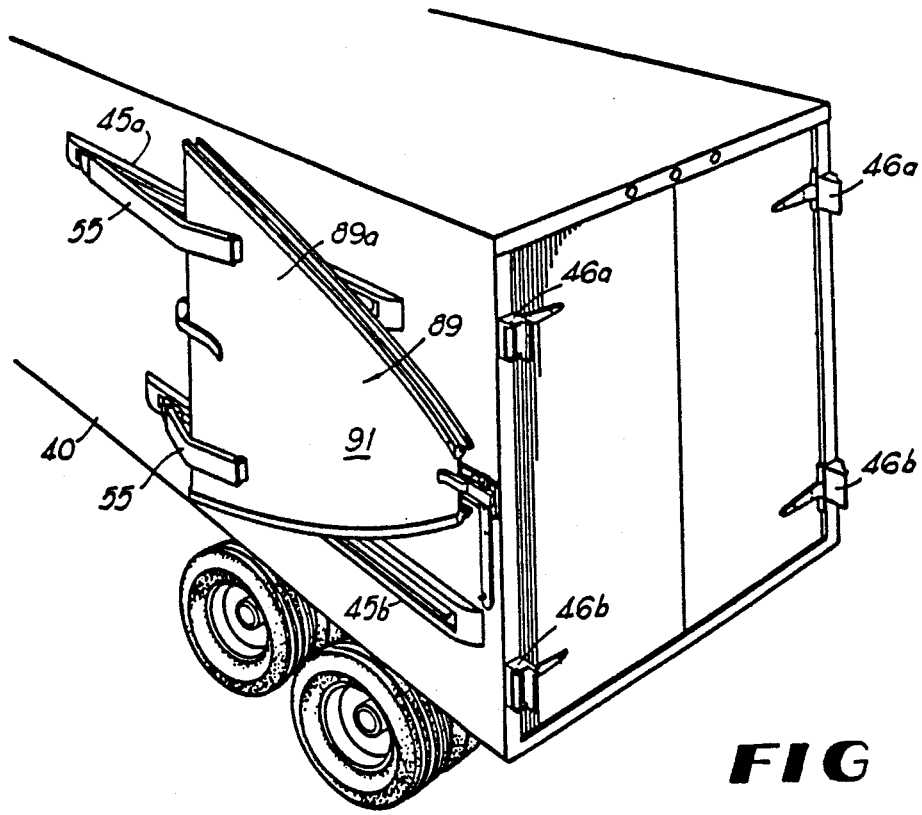
FIG. 24 is a perspective view of a folded and stored airfoil section according to a third embodiment of the invention.
Figure 25:
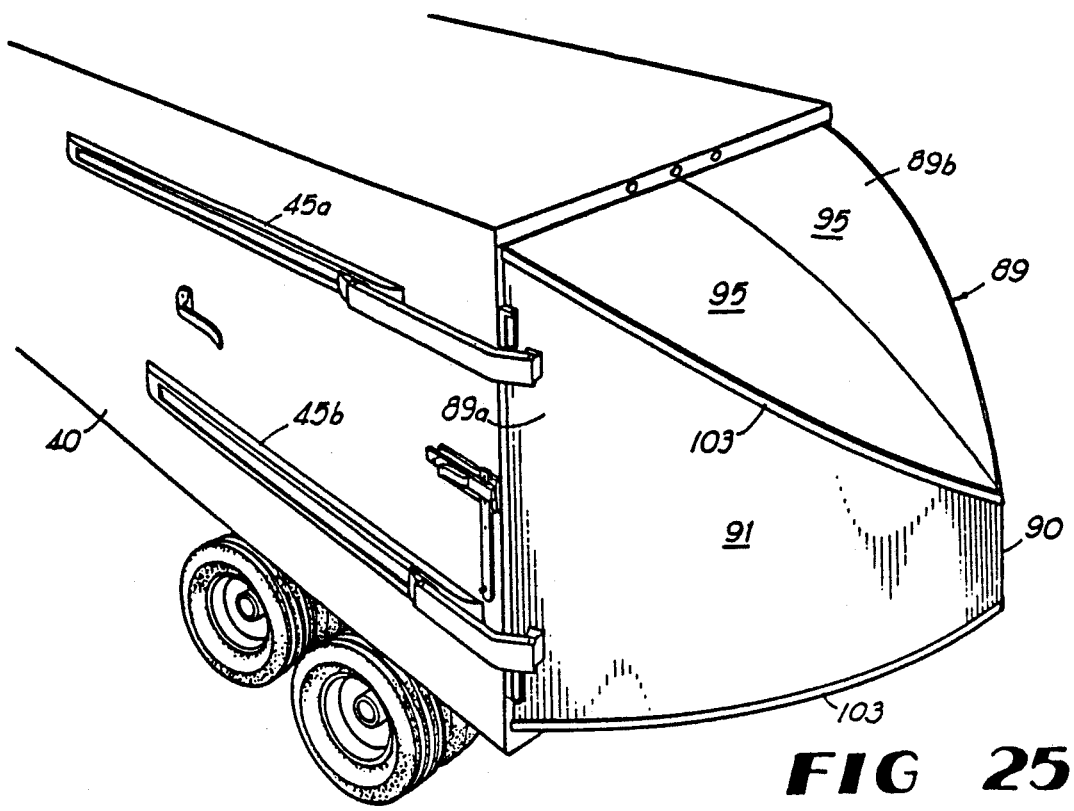
FIG. 25 is a similar view showing the complete airfoil in the erected, operative position.
Figure 26:
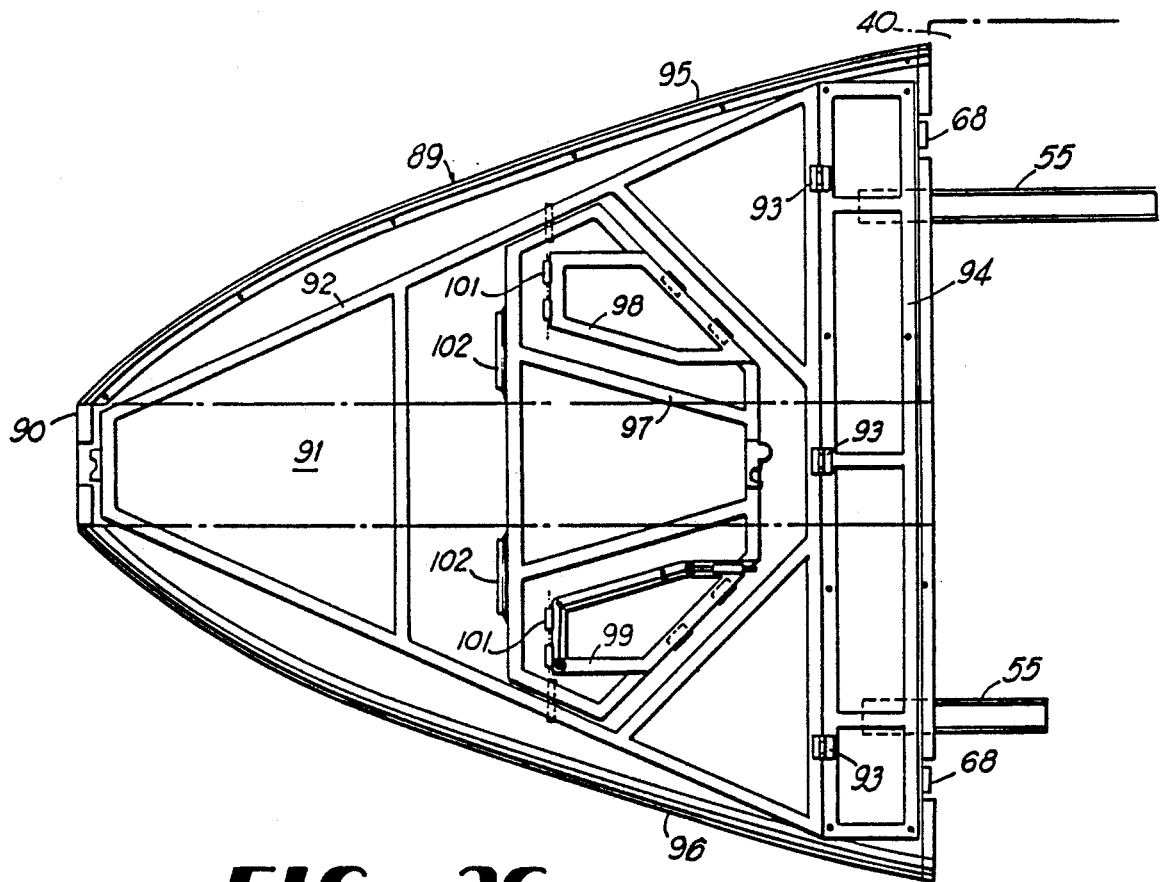
FIG. 26 is an interior side elevation of one airfoil section in FIG. 24 shown in its collapsed configuration, the top and bottom half-panels being omitted in the interest of showing better detail.
Figure 27:
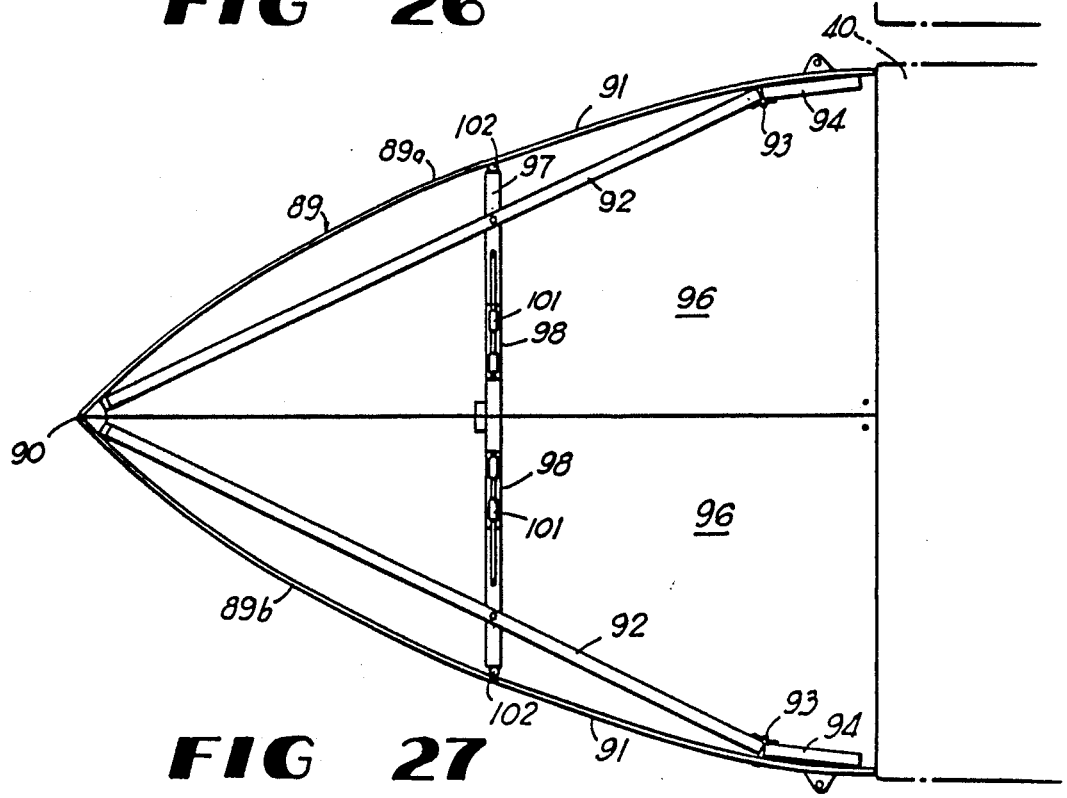
FIG. 27 is a horizontal section taken through the airfoil in FIG. 25 in its erected configuration.

FIGS. 24 through 30 depict another embodiment of the invention in which each airfoil assembly 89, in lieu of being a pyramid when erected, has four convergent, curvilinear walls terminating in a vertical sharp edge 90. The airfoils comprise panels made of flexible, resilient sheet material so that they can assume flat configurations for storage, as shown in FIG. 24, and curved configurations for operation, as shown in FIGS. 25-27. The basic mode of operation of the assembly 89 and its two companion sections 89a and 9b is as described in the prior embodiments, and the component parts which are identical will not be redescribed herein.

The main side panel 91 of each section of the airfoil 89 includes a roughly triangular support truss 2 hinged at 93 to a short, vertical, rectangular frame section 94 fixed to the panel 91. Coacting folding support frames connected between the top and bottom panels 95 and 96 include main frame portions 97 and hinged top and bottom frame portions 98 and 99, the latter being hinged at 100, FIG. 28, to the main portions 97 and pivotally and slidably connected at 101 to the top and bottom panels 95 and 96. Round cross-section bar elements 102, fixed to the main frame portions 97, slidably contact the resilient panels 91 so in the folding and unfolding of the support frame there will be no binding of the operation. Thus, as frame portion 97 pivots, the bar elements 102 move against the resilient panels 91 and cause them to bow outwardly and assume a curve configuration as shown in FIG. 27. Conversely, upon collapsing the frame the panels are permitted to reassume their original flat configuration as shown in FIG. 24.

Thus, the support framework of each airfoil section is comprised of three basic components, namely, the rectangular section 94 mounted to the side panels 91, the triangular section 92 hinged to the rectangular section 94, and the third component comprised of three sub-sections 97, 98, 98, the unfolding of which moves the third component sub-sections into a common plane across the longitudinal axis of the airfoil and causes the flexible side panel 91 and the flexible top and bottom panels 95 and 96 to move from their generally flat, stored position to their curvilinear configuration in the erected state.

Figure 29:
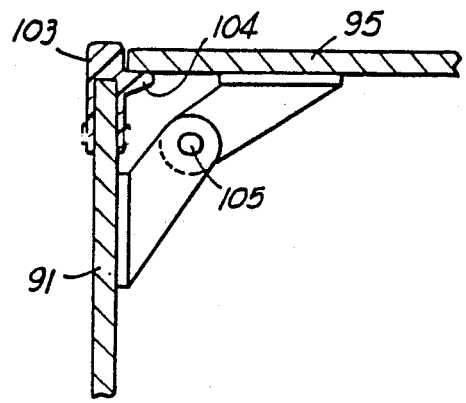
FIG. 29 is an enlarged view of a hinge joint in the area encompassed by the line 29 in FIG. 28.
Figure 30:
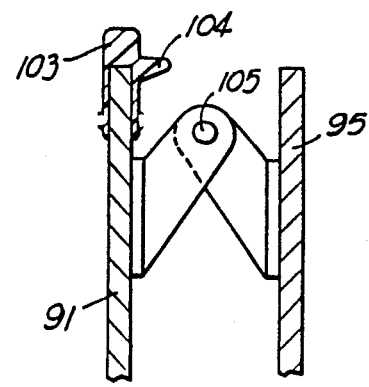
FIG. 30 is a similar view of the hinge joint in a folded condition.

FIGS. 29 and 30 show the constructional details of corner sealing for panels 95 and 91 and 96 and 91. Each flexible panel 91 carries edge seals 103 of rubber-like material along its opposite edges. These seals include side projections 104 which lap the interiors of panels 95 and 96 in the erected device. The main hinges 105 for the panel sections are also shown in FIGS. 29 and 30.

Figure 28:
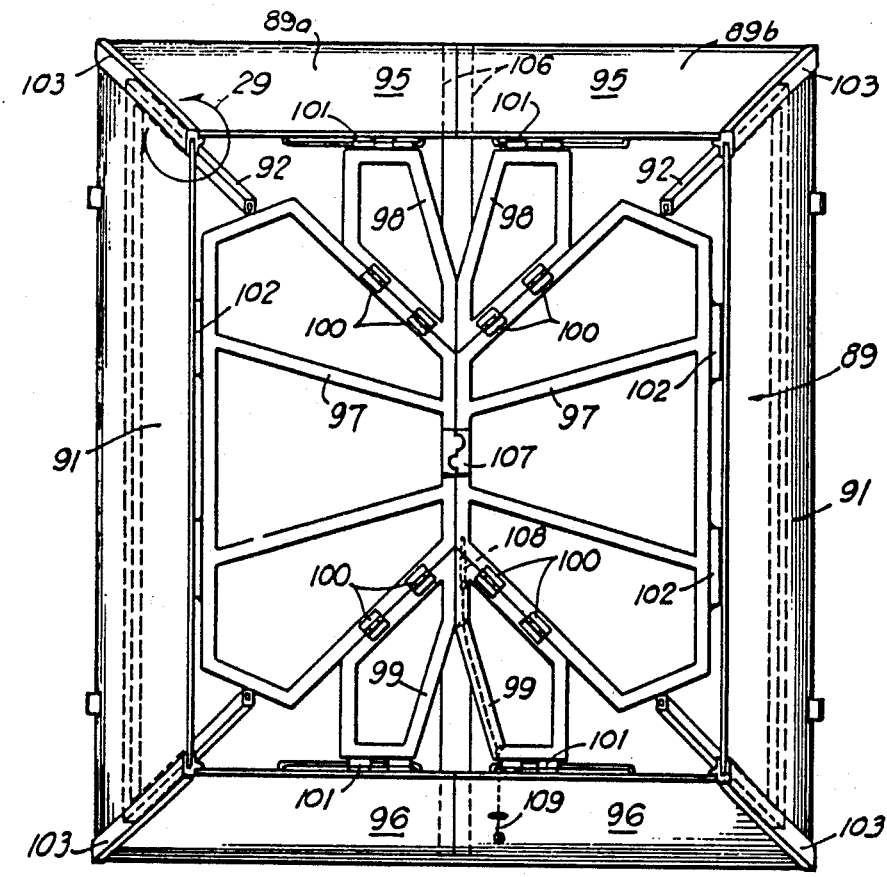
FIG. 28 is a vertical section taken through the airfoil in FIG. 25 showing the internal support frame thereof

Referring to FIGS. 26 and 28, cables 106 are connected between panels 95 and 96 to keep the panels from "bowing out" in their use positions. Coacting male and female lugs form an alignment mechanism 107 when airfoil 89 is in its operative mode. A locking pin 108 provides a means which rigidly maintains the internal support frame in its operational position. The rigidly locking pin 108 can be remotely operated by a cable 109 which penetrates the skin of airfoil section 96, FIG. 28. The locking pin 108 bridges one pair of adjacent frame portions 97 and 98 in their erected states and releasibly locks them.

It should now be apparent to those skilled in the art that through the invention a more efficient and more versatile airfoil for roadway vehicles has been provided without many of the drawbacks and deficiencies of the known prior art. The airfoil assemblies in accordance with the invention, when collapsed and stored on the sides of the truck, offer virtually no increased wind resistance and yet enable the vehicle, including the cab 41, to have the fullest maneuverability in cramped quarters. When deployed in their use positions, the airfoils 42 and 43 are more aerodynamically efficient than any known prior art device. They are still comparatively lightweight, are supported with stability at all times, are easy to manipulate, and relatively economical to manufacture and install on a vehicle. Additionally, a secure and convenient locking arrangement for the airfoil is provided.

It should be understood that the forms of the invention shown and described are to be taken as preferred examples of the same, and that various changes in the shape, size and arrangement of parts may be resorted to, without departing from the spirit of the invention or scope of the subjoined claims.

I claim:

1. An airfoil to lessen wind resistance of trucks and semi-trailers comprising a collapsible and erectable airfoil comprised of two companion laterally opposed airfoil sections each having a side panel to which a top and a bottom panel are hinged to be folded downwardly and upwardly respectively so as to lie inwardly of said side panel of each airfoil section in general parallelism therewith when the airfoil section is collapsed; rigidifying and supporting frame sections for said top, bottom and side panels of each airfoil section being hinged to each other so that said frame sections may collapse and thereby assume generally flat configurations when each airfoil section is collapsed, said frame sections adapted to be moved into a common plane across the airfoil near its longitudinal center to rigidify the airfoil when the airfoil is in an erected state; supporting guide rail means for said two companion airfoil sections on the exterior of the side walls of a truck body equipped with the airfoil; movable carriages engaged with the supporting guide rail means; struts pivotally interconnecting said carriages and the side panels of the airfoil; and interengaging locking means on an adjacent end wall of the truck body and on adjacent ends of the side panels of the airfoil.

2. An airfoil as defined in claim 1, and spring means on each end of the supporting guide rail means to engage the movable carriages at each end of their travel on the guide rail means to apply pressure thereto and to said struts.

3. An airfoil as defined in claim 1, and said interengaging locking means including locking sockets on the end wall of the truck body and locking T-bolt heads on the adjacent ends of the side panels of the airfoil adapted to enter said sockets.

4. An airfoil as defined in claim 3, and said supporting guide rail means, movable carriages, struts, and locking T-bolt means being in vertically spaced pairs on the truck body and said airfoil.

5. An airfoil to lessen wind resistance of truck and semitrailer bodies comprising a collapsible and erectable tapered airfoil comprised of two companion, laterally opposed sections each having top and bottom panels hinged to opposing edges of a side panel adapted to fold downwardly and upwardly respectively, a rigidfying and supporting framework for each airfoil section formed in three framework components, one component of the framework being secured to said side panel near one end thereof adjacent to the truck body, the second framework component being hingedly attached to said one component, the third framework component having three sub-sections which are hingedly interconnected, with a first sub-section of the third component being pivotally attached to said second component, and the other two sub-sections being hinged to said first sub-section and slidably and pivotally attached to said top and bottom panels, whereby all of the framework components may collapse substantially onto the side panel of each airfoil section when the airfoil is collapsed and when the airfoil is erected to have the third component including its three sub-sections disposed across a longitudinal axis of the airfoil with said three sub-sections of the third component lying in a common plane between ends of the second component and spaced from the first component, the framework of the two companion airfoil sections then meeting substantially in a common plane across the longitudinal axis of the airfoil to form a substantially unitized framework across the erected airfoil internally thereof, and vehicle side wall support and stowage means for said airfoil sections and their framework in a collapsed substantially flush configuration.

6. An airfoil for lessening wind resistance of trucks and semi-trailers adapted to be bifurcated into two airfoil sections stored flatly beside the truck sides and erected into a tapered unitized configuration to the front or rear of the truck, and with each airfoil section comprising a resilient side panel, a resilient top panel hinged to the top of said side panel, and a resilient bottom panel hinged to the bottom of said side panel, a frame for each of said airfoil sections, with each frame comprised of a plurality of frame sections coupled together and including a section attached to said side panel and other sections attached to said top and bottom panels, and with each frame adapted to be configured flatly for storage beside said side panel and erected into an erect position with said frames of each airfoil section interlocked and urging said side, top and bottom panels outwardly into a tapered, unitized configuration.

7. The airfoil of claim 6 wherein said other frame sections are slidably and pivotably attached to said top and bottom panels.

* * * * *